(12) United States Patent
Hosokawa

(10) Patent No.: US 8,888,191 B2
(45) Date of Patent: Nov. 18, 2014

(54) VEHICLE SEATS

(71) Applicant: Toyota Boshoku Kabushiki Kaisha, Aichi-ken (JP)

(72) Inventor: Kazuhisa Hosokawa, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/723,742

(22) Filed: Dec. 21, 2012

(65) Prior Publication Data

US 2013/0249267 A1 Sep. 26, 2013

(30) Foreign Application Priority Data

Mar. 21, 2012 (JP) .................................. 2012-063327

(51) Int. Cl.
*B60N 2/68* (2006.01)
*B60N 2/235* (2006.01)
*B60N 2/22* (2006.01)

(52) U.S. Cl.
CPC ................ *B60N 2/22* (2013.01); *B60N 2/2356* (2013.01); *B60N 2/68* (2013.01); *B60N 2/682* (2013.01)
USPC .................................................... 297/452.18

(58) Field of Classification Search
USPC ......................................... 297/452.18, 452.2
See application file for complete search history.

(56) References Cited

U.S. PATENT DOCUMENTS

| | | | | | |
|---|---|---|---|---|---|
| 2,401,542 | A | * | 6/1946 | Booth ........................... | 228/150 |
| 4,575,153 | A | * | 3/1986 | Aoki et al. ................. | 297/452.2 |
| 5,660,443 | A | * | 8/1997 | Pedronno .................... | 297/452.2 |
| 5,749,135 | A | * | 5/1998 | Crane et al. ..................... | 29/415 |
| 6,869,145 | B2 | * | 3/2005 | Matsunuma ............. | 297/452.18 |
| 7,677,669 | B2 | * | 3/2010 | Blankart .................. | 297/452.18 |
| 8,061,779 | B2 | * | 11/2011 | Nakagaki et al. .......... | 297/452.2 |
| 8,267,479 | B2 | * | 9/2012 | Yamada et al. .......... | 297/452.18 |
| 2007/0210638 | A1 | * | 9/2007 | Adragna et al. ........... | 297/452.2 |
| 2013/0140868 | A1 | * | 6/2013 | Muck et al. ................ | 297/452.2 |

FOREIGN PATENT DOCUMENTS

| | | |
|---|---|---|
| JP | 4087764 | 2/2008 |
| JP | 2011-116303 | 6/2011 |
| JP | 2011-131697 | 7/2011 |

* cited by examiner

*Primary Examiner* — Milton Nelson, Jr.
(74) *Attorney, Agent, or Firm* — Greenblum & Bernstein, P.L.C.

(57) ABSTRACT

Embodiments of the present invention may include a vehicle seat having a side frame, a bracket, and a reclining device. The side frame has a closed cross-sectional configuration. The bracket is formed from a plate-like member. The bracket has a side surface to be connected with the side frame. The reclining device is connected to the side surface of the bracket to which the side frame is connected, so that the reclining device is connected to the side frame via the bracket.

2 Claims, 9 Drawing Sheets

VEHICLE SEATS

This application claims priority to Japanese patent application serial number 2012-63327, the contents of which are incorporated herein by reference.

BACKGROUND OF THE INVENTION

1. Field of the Invention

Embodiments of the present invention relate to vehicle seats, more specifically, vehicle seats equipped with a side frame of a closed cross-sectional configuration.

2. Description of the Related Art

Japanese Patent No. 4087764 discloses a vehicle seat frame structure. The frame structure has a seatback side frame connected to a seat cushion side frame via a reclining device. The seatback side frame is formed in a rectangular, closed cross-sectional configuration of high structural strength. A thick arm plate is bonded to the outer side of the side frame. The reclining device is connected to the outer side of the arm plate.

It should be noted, however, that the arm plate and the reclining device protrude laterally from the outer side of the side frame. This results in an increase in the seat size in the width direction.

Therefore, there is need in the art for a frame structure with high structural strength while being compact in the seat width direction.

SUMMARY OF THE INVENTION

Certain embodiments of the present invention may include a vehicle seat having a side frame, a bracket and a reclining device. The side frame has a closed cross-sectional configuration. The bracket is formed from a plate-like member. The bracket has a side surface connected to the side frame. The reclining device is connected to the side surface of the bracket to which the side frame is connected, so that the reclining device is connected to the side frame via the bracket.

Thus, the side frame of a closed cross-sectional configuration and the reclining device are arranged side by side without overlapping each other in the width direction. Thus, the three members are connected together without involving an increase in space in the width direction. Accordingly, it is possible for a frame structure equipped with a side frame of high structural strength and having a closed cross-sectional configuration to be formed compact in the width direction.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
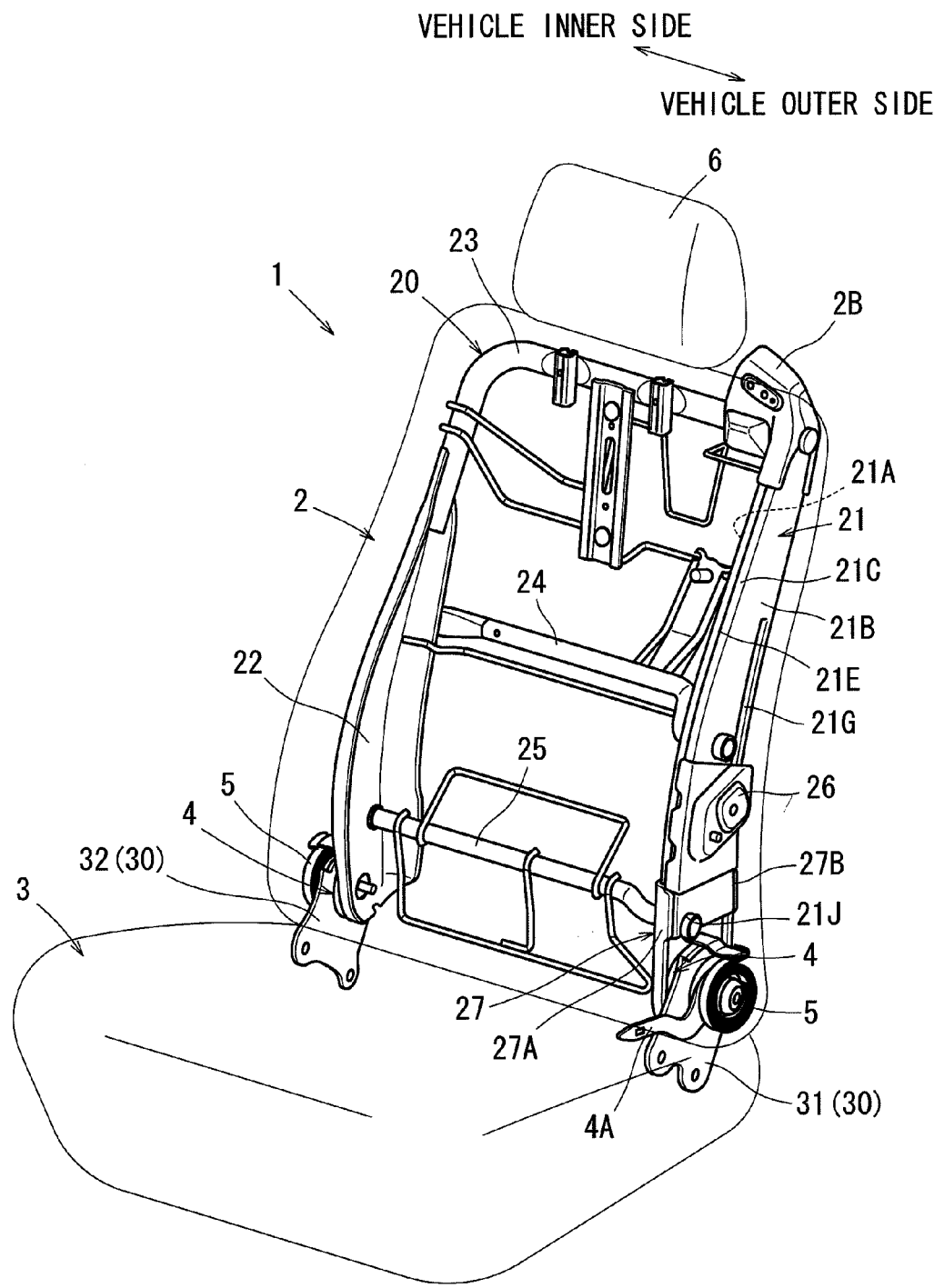
FIG. 1 is a perspective view of a seat frame structure for a vehicular seat according to one embodiment.

As shown in FIG. 1, a vehicle seat 1 is formed as a front seat. The vehicle seat 1 has a seatback 2 having a backrest, a seat cushion 3 having a seating portion, and a headrest 6 on which to rest a head of a user. The seat cushion 3 is installed on a vehicle floor. The lower end portions of both the right and left sides of the seatback 2 are connected to the rear end portions of both the right and left sides of the seat cushion 3, respectively, by reclining devices (rotary shaft devices) 4. The reclining devices 4 are of a disc-like configuration, and are configured to support the seatback 2 so as to allow it to rotate and to be locked with respect to the seat cushion 3. This makes it possible to adjust the backrest angle of the seatback 2 with respect to the seat cushion 3.

Normally, the seatback 2 is locked from rotating through locking of the reclining devices 4, thus fixing the backrest angle. The fixed state of the backrest angle of the seatback 2 is released through pulling-up on an operation lever 4A that is provided on the vehicle outer side (the right-hand side as seen in the drawing) of the seat cushion 3. Through the pulling-up of the operation lever 4A, the reclining devices 4 are collectively released from the rotation-lock state. As a result, the seatback 2 is moved in a state in which it freely allows changing of the backrest angle thereof.

Spiral springs 5 are provided between the seatback 2 and the seat cushion 3. Normally, the spiral springs 5 generate a biasing force for causing the seatback 2 to rotate forwards. Through the releasing of the backrest-angle-lock state, the seat back 2 is raised to a position where the seat back 2 abuts a back of a seated occupant. The seatback 2 may then be tilted in response to forward and backward tilting of the back of the occupant. In this way, the backrest angle may be changed. The basic structure of each reclining device 4 is the same as that of the reclining device as disclosed in prior-art documents such as Japanese Laid-Open Patent Application No. 2011-116303. The headrest 6 is attached to an upper portion of the seatback 2 and is fixed in position.

The vehicle seat 1 is equipped with a seatbelt device (not shown) for constraining a body of the occupant. A belt extraction port 2B is provided at a shoulder portion on the vehicle outer side of the seatback 2. A retractor (not shown) is provided behind the seatback 2. A webbing (not shown) of the seatbelt device is forwardly extracted from the retractor via the belt extraction port 2B. The webbing is passed through a tongue (not shown). The webbing is obliquely stretched over the body of the occupant, and the tongue is attached to a buckle (not shown) provided on the vehicle inner side (i.e., the left-hand side of the vehicle interior as seen in the drawing) of the seat cushion 3 to be fixed in position (in-use state). The seatbelt device with which the seatback 2 is provided has the same basic structure as the device disclosed in prior-art documents such as Japanese Laid-Open Patent Application No. 2011-131697.

When, in the in-use state of the seatbelt device, there occurs, for example, collision of the front portion of the vehicle, a large load is applied to the webbing from the body of the occupant. At this time, the belt extraction port 2B receives a strong forward pulling force from the webbing. Due to this force, a load is applied to a side frame 21 on the vehicle outer side of the seatback 2. The load pulls the shoulder portion of the seatback 2 using a fulcrum. The fulcrum is the lower end portion of the side frame 21 fixedly supported by the reclining device 4. As a result, a strong bending force is applied to the seatback 2. To cope with this load, the side frame 21 on the vehicle outer side is constructed with a high structural strength to reduce bending deformation thereof.

Figure 3:
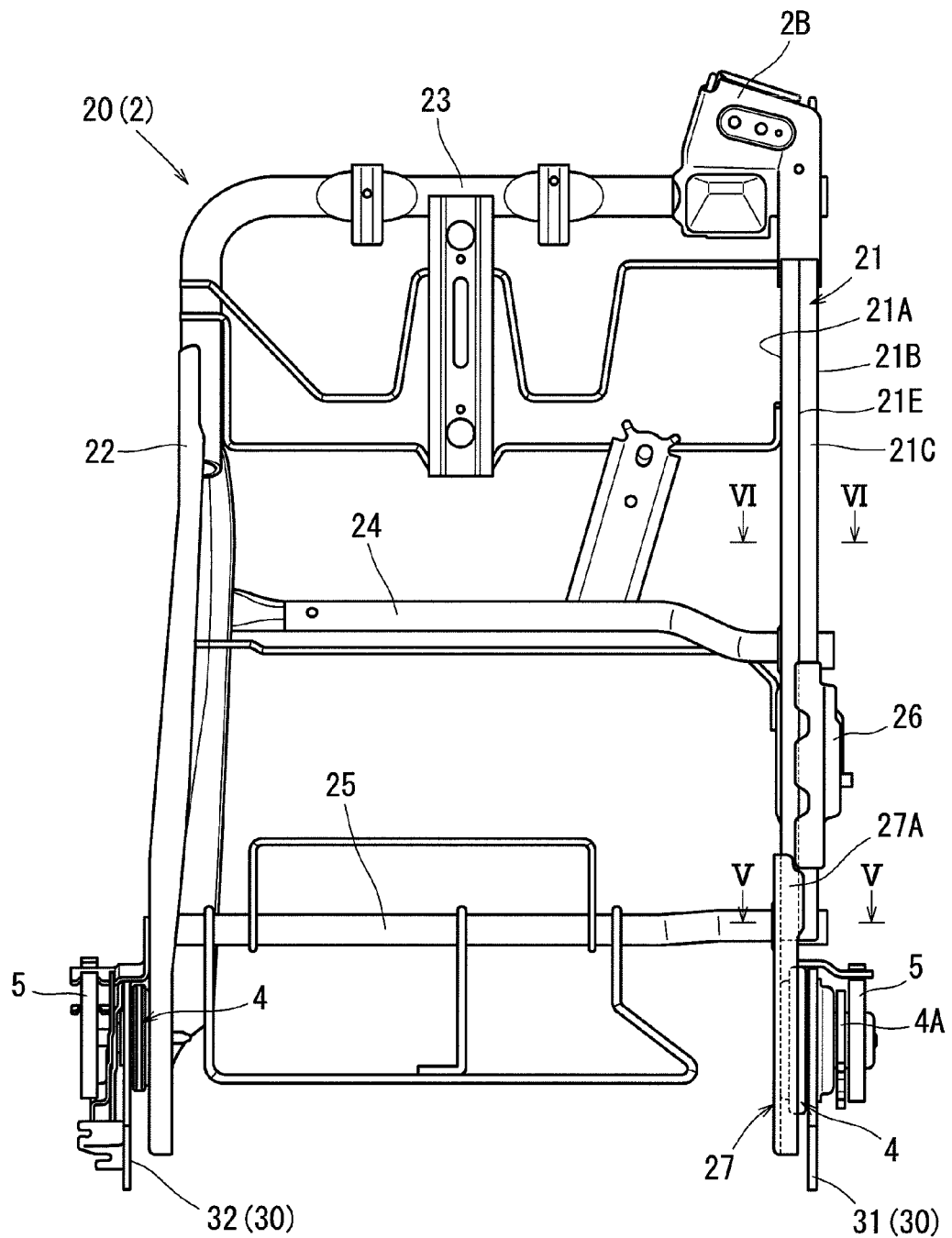
FIG. 3 is a front view of the seat frame structure for the vehicular seat.

A seatback frame 20 is of a reverse-U-shaped configuration, and has side frames 21 and 22 and an upper frame 23. The side frames 21 and 22 constitute right and left side portions of the seatback 2. The side frames 21 and 22 are formed of vertically elongated steel plates. The upper frame 23 extends between upper portions of the side frames 21 and 22 to connect the upper portions together. The upper frame 23 constitutes the upper framework of the seatback 2. As shown in FIGS. 1 and 3, the upper frame 23 is formed of a round steel pipe. The upper frame 23 has an L-shape formed by a bending the pipe. The upper frame 23 is bent downwards as seen in the drawings, and has one end. The one end on the vehicle inner side (the left-hand side as seen in the drawings) is fit and welded to an upper portion of the side frame 22. The upper portion of the side frame 22 is drawn into a half pipe. The other end of the upper frame 23 on the vehicle outer side (right-hand side as seen in the drawings) is faced and welded to an upper portion of the side frame 21.

The side frames 21 and 22 are elongated and extend in the vertical direction. The side frames 21 and 22 have an arcuate shape. The side frames 21 and 22 curve backward into an arcuate shape from their lower end portions to their upper end portions. Due to their curved configuration, middle portions of the side frames 21 and 22 protrude forward on both sides of a waist of the occupant. As a result, it is possible to set, at both sides of the waist, large side support portions supporting the waist from both outer sides. By supporting the waist at a still more forward position, it is possible to strongly support the waist. Since the seatback 2 is curved backwards, it is possible to secure a large knee space for the occupant seated on the seat behind to stretch their legs forward.

The side frame 22 on the vehicle inner side (the left-hand side as seen in the drawings) is formed by cutting a single elongated steel plate into an arcuate shape and bending the front edge and the rear edge thereof toward the seat inner side. The side frame 22 has a U-shaped sectional configuration. The side frame 21 on the vehicle outer side (the right-hand side) is formed by bending a single elongated steel plate in the lateral direction into a rectangular cross-sectional configuration. The edge portions of the steel plate are connected together through welding to form a seam 21E. The side frame 21 is formed as a rectangular tube exhibiting a closed cross-sectional configuration.

Figure 7:
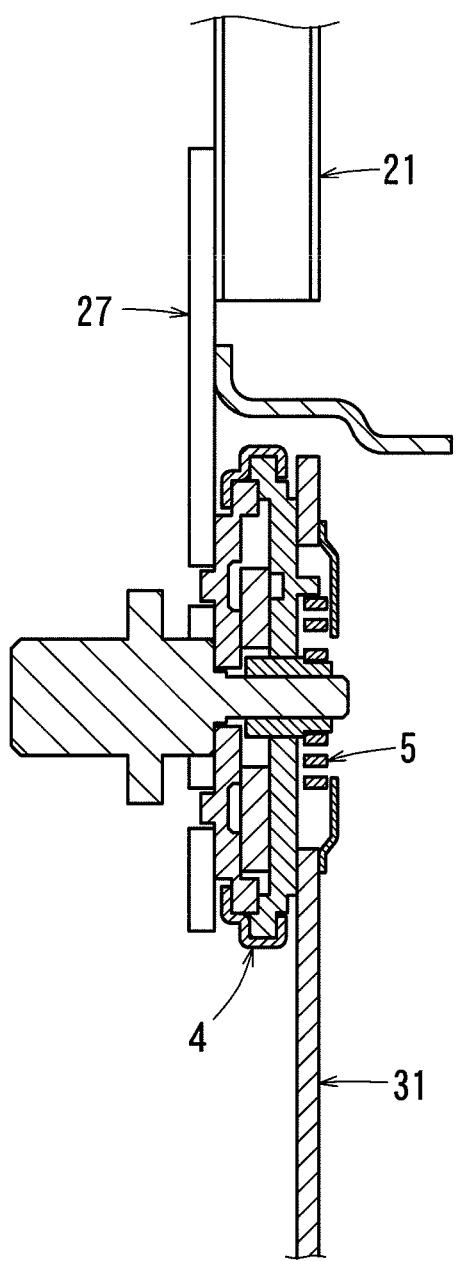
FIG. 7 is a cross-sectional view taken along line VII-VII in FIG. 4.

With reference to FIG. 7, the closed cross-sectional configuration of a side frame 21 is further discussed. FIG. 7 represents a cross-sectional view of an embodiment of the invention found in a vehicle seat. The embodiment is comprised of a (upper seat) side frame 21, a bracket 27, reinforcing pipe 25, spiral springs 5, reclining device 4 and a (lower seat) side frame 31. Side frame 21 and side frame 31 each show a closed cross-sectional configuration. A "closed" cross-sectional configuration is meant to refer to an outer surface of an object that has little or no room for objects to pass between the outer edges of its cross-sectional view. It is generally continuous in structure in order to act as a cohesive unit. A closed cross-sectional configuration may comprise of a single structure or multiple structures connected together. Side frame 21 and side frame 31 show single outer wall enclosures in this embodiment. Other embodiments may take the form of two separate wall portions arranged to face each other. Such configurations may take a rectangular shape as shown in this embodiment. Other various shapes such as circular, triangular and elliptical shapes are but a few examples of the shapes that a closed cross-sectional configuration may form. Such shapes can take forms lacking standard geometrical names. Further, it is contemplated that multiple, separate elements of an embodiment could be comprised with a single closed cross-sectional configuration. For example, a side frame 21 and the reclining device 4 could together be formed in a closed cross-sectional configuration. Further both side frames 21, 31 and the reclining device 4 could together be formed in a closed cross-sectional configuration. It is also anticipated that other portions of a vehicle seat such as the bracket 27 could be included in a closed cross-sectional configuration. A vehicle seat may have separate closed cross-sectional configurations. For example, seat frame 21 and reclining device 4 may faun a first closed cross-sectional configuration while side frame 31 forms a second closed cross-sectional configuration.

Figure 2:
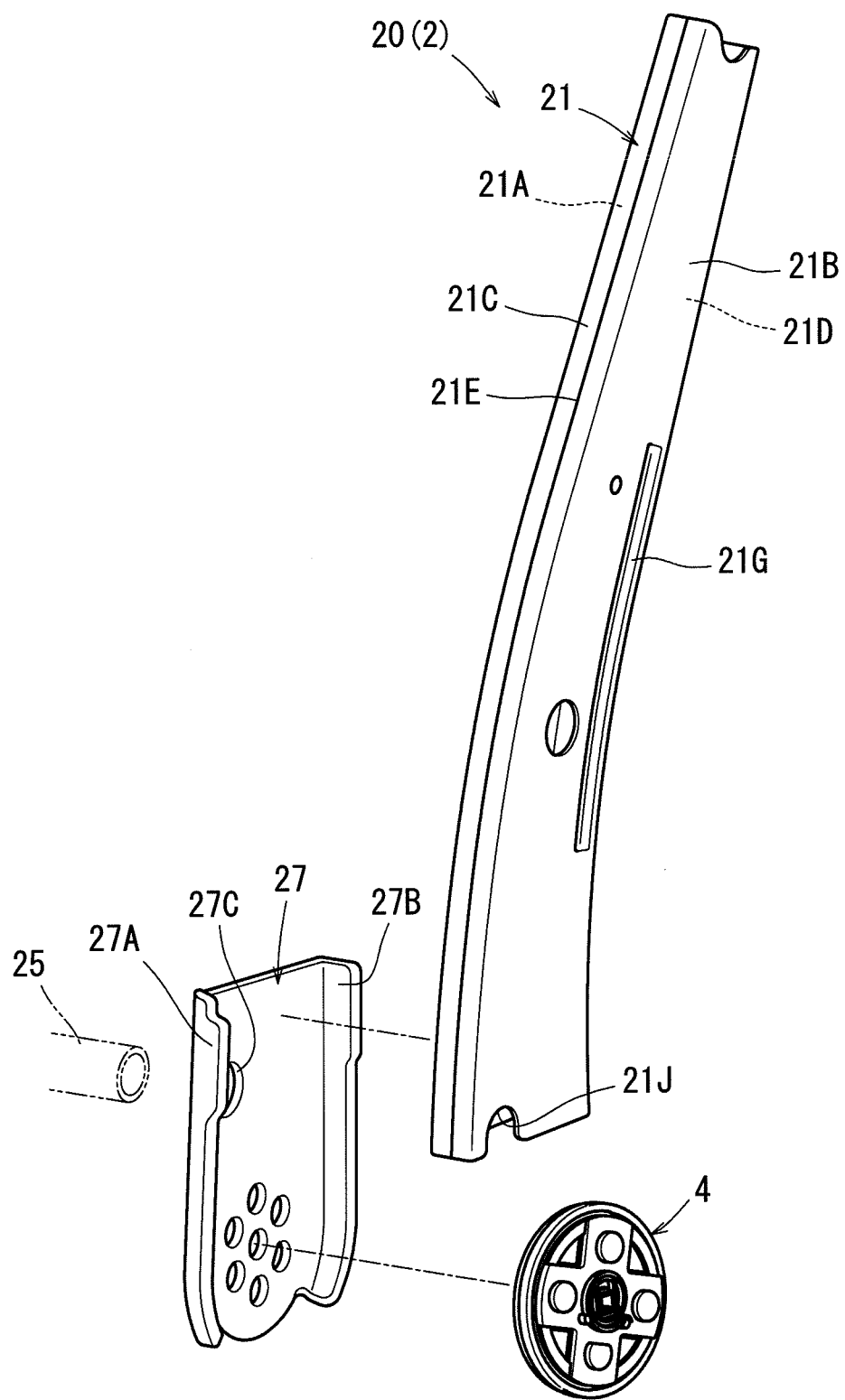
FIG. 2 is an exploded perspective view of a side frame located on a vehicle outer side of a seatback.
Figure 4:
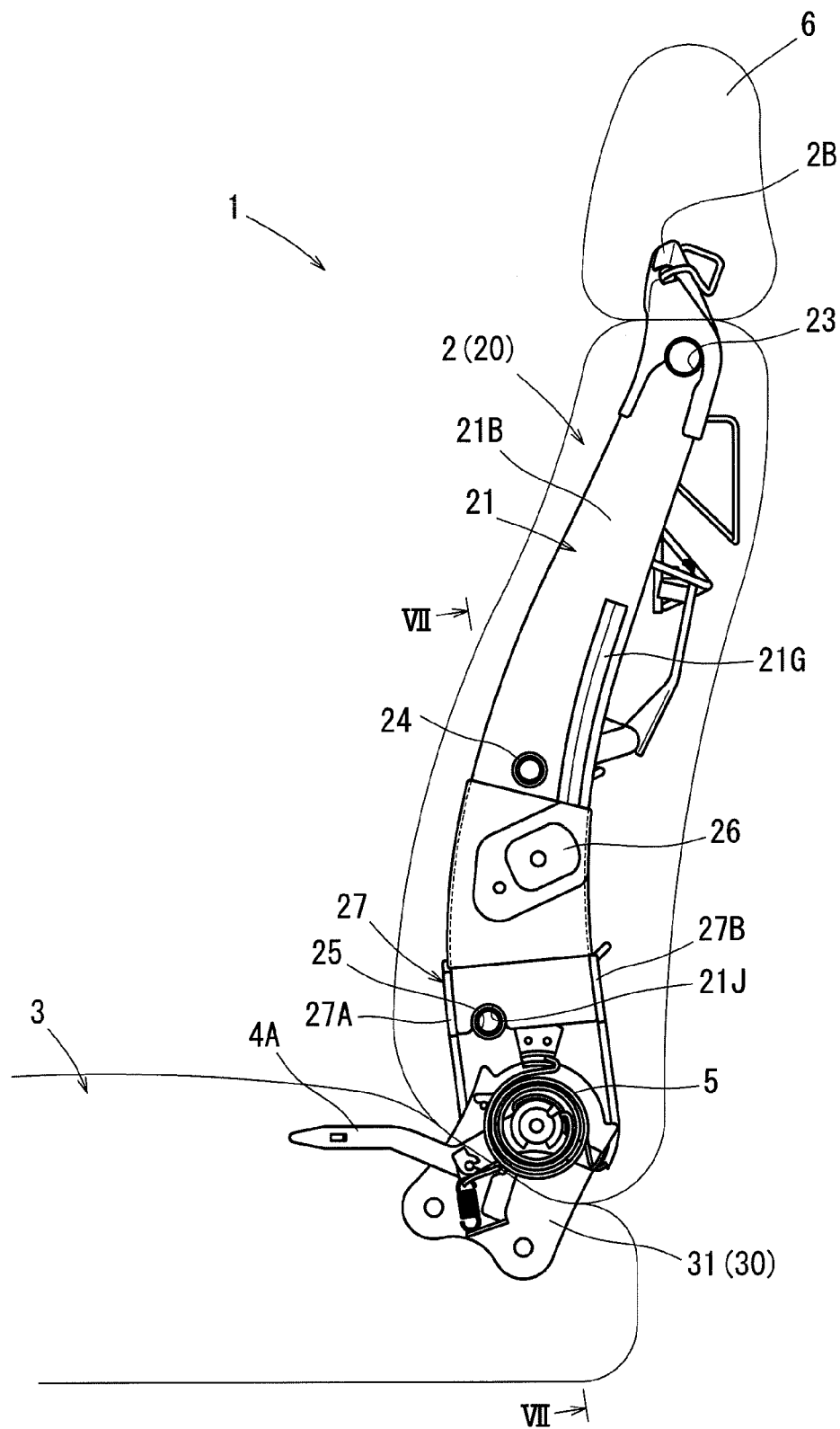
FIG. 4 is a side view of the seat frame structure for the vehicular seat.

Further, the side frame 21 is bent into an arcuate shape through press work (see FIGS. 2 and 4). The side frame 21 can be manufactured of a high-tension steel plate of high structural strength with respect to bending and torsion. When a structure in the form of a rectangular tube formed of high strength material is bent into an arcuate shape, the ductility of the high strength material is reduced. As a result, there may be involved problems in forming such as wrinkling and cracking. To suppress the generation of such problems in forming, grooves 21F, 21G, and 21H are formed in an inner side surface 21A, an outer side surface 21B, and a rear edge surface 21D of the side frame 21 (see FIG. 6). The grooves 21F, 21G, and 21H are recessed streaks extending in the longitudinal direction of the side frame 21.

Figure 6:
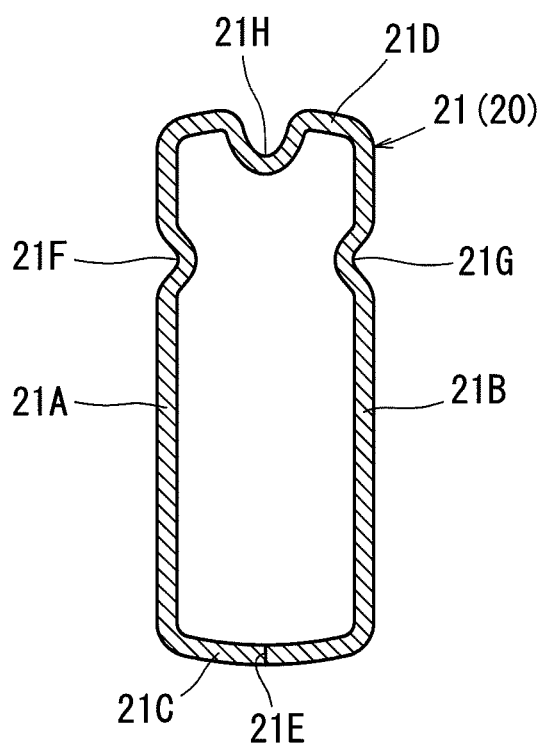
FIG. 6 is a cross-sectional view taken along line VI-VI in FIG. 3.

As shown in FIG. 2, the side frame 21 has the seam 21E on an edge surface 21C facing forward, and is curved backwards in an arcuate shape. The groove 21H (see FIG. 6) is formed on the rear edge surface 21D. The grooves 21F, 21G and 21H are formed on the inner peripheral edge of the arcuate side frame 21, on the inner side surface 21A of the side frame 21, and on the outer side surface 21B, respectively. The grooves 21F, 21G, and 21H are formed in the backwardly curved portions, i.e., in the height region in the vicinity of the waist of the occupant. Preferably no grooves are formed in the slightly curved upper and lower regions of the side frame. The outer peripheral surfaces of the upper region and the lower region exhibit a flat surface configuration devoid of recess. As shown in FIG. 6, the grooves 21F, 21G, and 21H are formed as streaks extending in the longitudinal direction of the side frame 21. The grooves 21F, 21G, and 21H are formed through bending so as to recess the sectional configuration of the side frame 21, and protrude toward the center of the side frame 21. The grooves 21F, 21G and 21H are formed through press work before forming the side frame 21 in a closed cross-sectional configuration through bending and welding.

As shown in FIG. 2, when forming the side frame in an arcuate configuration, the edge surfaces 21A, 21B, and 21D receive a compression force that tends to cause local deformation on the face of the side frame 21. The compression force is relieved by the grooves 21F, 21G, and 21H. As a result, it is possible to suppress generation of problems in forming the side frame 21 caused by the compression force, such as wrinkling and cracking. Consequently, the side frame 21 can be curved smoothly into an arcuate shape. The side frame 21 is preferably formed of a high tension steel plate of high structural strength. It exhibits a closed cross-sectional configuration, and can be formed in a smoothly arcuate configuration.

As shown in FIG. 1, the side frame 21 is located opposite the side frame 22 in the width direction. The side frames 21 and 22 are connected together by the upper frame 23 extending between their upper end portions. Further, the side frames 21 and 22 are connected together by two reinforcing pipes 24 and 25. The reinforcing pipes 24 and 25 are formed by round steel pipes in a crankshaft-like bent configuration. The reinforcing pipes 24 and 25 bridge the intermediate portions and the lower portions of the side frames 21 and 22 in the width direction.

The reinforcing pipe 24 has an end portion of a plate-like, crushed configuration on the vehicle inner side, i.e., on the left-hand side as seen in the drawing. The end portion is connected by welding to the flange-like bent rear edge portion of the side frame 22 on the same side. The reinforcing pipe 24 has another end portion on the vehicle outer side, i.e., on the right-hand side as seen in the drawing. The end portion is fit-engaged with the inner side surface 21A and the outer side surface 21B of the side frame 21 on the same side so as to extend through them. The end portion is connected to the side frame 21 at the fit-engagement portions through welding.

The reinforcing pipe 25 has an end portion on the vehicle inner side, i.e., on the left-hand side as seen in the diagram. The end portion is fit-engaged with the side frame 22 on the same side so as to extend through it, and is connected to the side frame 22 at the fit-engagement portion through welding. The reinforcing pipe 25 has another end portion on the vehicle outer side, i.e., on the right-hand side as seen in the drawing. The end portion is fit-engaged with the inner side surface 21A and the outer side surface 21B of the side frame 21 on the same side so as to extend through them, and is connected to the side frame 21 at the fit-engagement portions through welding. The reinforcing pipe 25 is also passed through a plate-like bracket 27 to be fit-engaged therewith.

The reinforcing pipes 24 and 25 are formed like rungs of a ladder in the seatback frame 20. As a result, the structural strength of the seatback frame 20 is enhanced with respect to bending or torsion. The belt extraction port 2B of the seatbelt device is integrally connected with the connection portion between the upper end portion of the side frame 21 and the upper frame 23. A support bracket 26 for attaching and supporting an armrest device (not shown) may be integrally connected with the outer side surface 21B of the side frame 21.

The lower end portions of the side frames 21 and 22 are connected to the rear end portion of side frames 31 and 32 by the reclining devices 4. As a result, the right and left portions of the seatback frame 20 are connected to and supported by the right and left portions of the seat cushion frame 30 comprising the frame structure of the seat cushion 3. As shown in FIGS. 1 and 3, the lower end portion of the side frame 22 is situated on the inner side of the rear end portion of the side frame 32 and faces the side frame 32 in the width direction. The side frame 22 is connected to the side frame 32 by the reclining device 4 so as to allow rotation and locking.

As shown in FIG. 2, the bracket 27 is formed of a steel plate of a larger thickness than the plate forming the side frame 21. The bracket 27 is connected to the lower end portion of the side frame 21. As shown in FIGS. 1 and 3, the bracket 27 is connected to the side frame 31 by the reclining device 4 so as to allow rotation and locking. As shown in FIG. 2, the bracket 27 is integrally connected through welding to the lower portion of the inner side surface 21A of the side frame 21. As shown in FIGS. 1 and 3, the bracket 27 has a distal end portion extending below the side frame 21. The distal end portion is situated on the inner side of the rear end portion of the side frame 31, and faces the side frame 31 in the width direction. The portion of the bracket 27 is connected to the side frame 31 by the reclining device 4, arranged between them, so as to allow rotation and locking.

Figure 5:
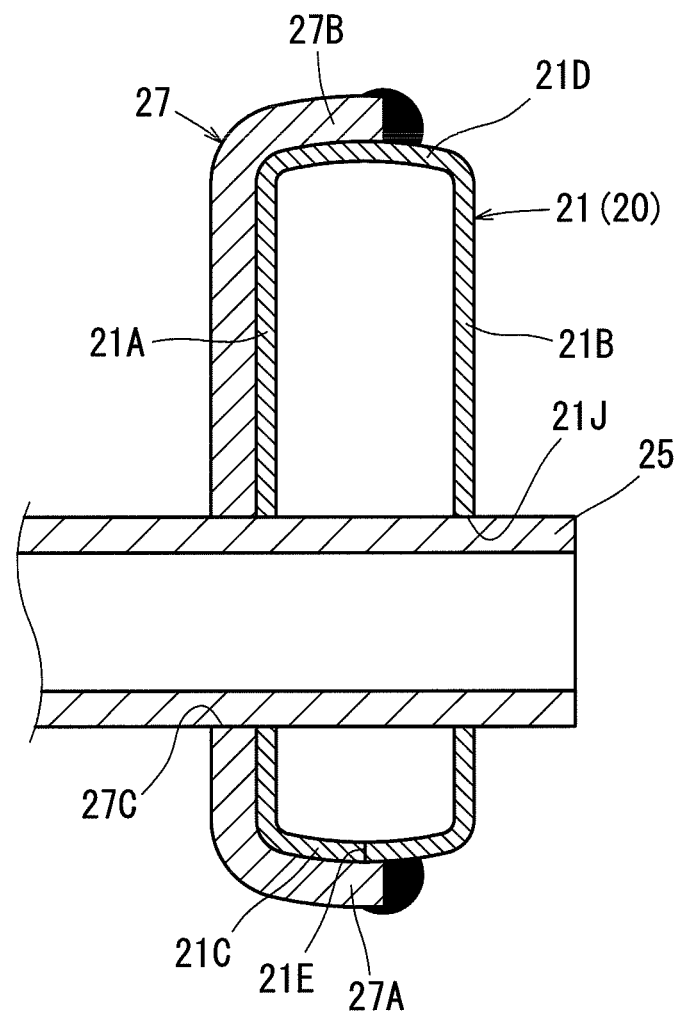
FIG. 5 is a cross-sectional view taken along line V-V in FIG. 3.

As shown in FIGS. 2 and 5, the bracket 27 has a front side flange portion 27A and a rear side flange portion 27B. The flange portions 27A and 27B face the edge surfaces 21C and 21D of the side frame 21. As a result, the bracket 27 holds the side frame 21 from the front and rear sides. As shown in FIG. 2, the flange portions 27A and 27B extend to the vehicle outer side from the front and rear edges of the bracket 27, and have portions further extending to the vehicle outer side. As shown in FIG. 5, the flange portion 27A has a portion extending to a position where it covers the seam 21E formed at the central portion of the edge surface 21C of the side frame 21. The portion is connected with the edge surface 21C through welding. The flange portion 27B has a portion extending to the same degree as that of the flange portion 27B, and the portion is connected with the edge surface 21D of the side frame 21 through welding.

The flange portion 27A is welded for fixation to the side frame 21 at a position beyond the position where it covers the seam 21E. As a result, the load applied to the seam 21E of the side frame 21 is allowed to escape to the side frame 21, thus relieving the load. Thus, the structural strength of the side frame 21 is further enhanced.

As shown in FIG. 2, the lower portions of the side surfaces 21A and 21B of the side frame 21 exhibit none of the grooves 21F, 21G, and 21H, thus exhibiting a flat surface configuration devoid of recess. Thus, the lower portions of the side surfaces 21A and 21B are held in contact with the edge surface 21C or the edge surface 21D of the side frame 21 with large contacting areas or large welding areas.

As shown in FIG. 2, in addition to the flange portions 27A and 27B, the upper side edge portion and the lower side edge portion thereof are held in contact with the side surface 21A of the side frame 21 are connected to the bracket 27 through welding. As a result, the bracket 27 is connected to the side frame 21 firmly and integrally. The side frame 27 is connected to the reclining device 4 via the bracket 27. The bracket 27 is formed of a steel plate having a large thickness. Accordingly, the bracket 27 helps to effectively enhance the structural strength of the fixed end portion of the lower portion of the side frame 21. The side frame 21 receives the largest bending stress load when a large load is applied. As a result, when a large load is applied, local deformation such as buckling deformation accompanying local stress concentration on the side frame 21 is not easily generated.

The bracket 27 is connected to the side surface 21A of the side frame 21. The side frame 21 and the reclining device 4 are connected to the same side (outer side) with respect to the bracket 27. The side frame 21 and the reclining device 4 are arranged side by side in a direction different from the width direction, such as in the vertical direction. Accordingly, the side frame 21, the reclining device 4, and the bracket 27 are connected together, with the installation space in the width direction being kept small. As a result, the frame structure equipped with the side frame 21 of a closed cross-sectional configuration and of high structural strength can be formed compact in the width direction.

As shown in FIGS. 1 and 2, the end portion on the vehicle outer side of the reinforcing pipe 25 is passed through the bracket 27 in the thickness direction of the bracket 27. Further, the end portion is passed through the side frame 21 on the vehicle outer side such that the upper half of the pipe extends through a semicircular hole 21J of the side frame 21. The end portion is passed through a round hole 27C extending through the bracket 27 in the thickness direction. The round hole 27C locates at a position corresponding to the semicircular hole 21J. The semicircular hole 21J extends through the lower edge portion of the side frame 21 in the thickness direction. The end portion is connected to the edge of the round hole 27C and to the edge of the semicircular hole 21J through welding.

As shown in FIGS. 2 and 5, the bracket 27 has flange portions 27A and 27B extending along the edge surfaces 21C and 21D on both sides of the side frame 21 to hold the side frame 21 along a lateral direction of the side frame 21. The flange portions 27A and 27B are welded to the edge surfaces 21C and 21D of the side frame 21 for fixation. Accordingly, the bracket 27 and the side frame 21 can be firmly connected together without involving an increase in installation space in the width direction.

As shown in FIGS. 2 and 5, the side frame 21 has a seam 21E formed through welding to form a closed section. The seam 21E is formed at one of the edge surfaces 21C and 21D on both sides of the side frame 21. The flange portion 27A extends to a position where it covers the seam 21E. The flange portion 27A is welded to one edge surface 21C at this extended position through welding for fixation. Thus, the load applied to the seam 21E is allowed to escape to the bracket 21 to be thereby mitigated. Accordingly, the structural strength of the side frame 21 can be further enhanced.

As shown in FIGS. 2 and 6, the side frame 21 has an arcuate configuration with one edge surface 21C having a seam 21E. This one edge surface 21C constitutes an outer peripheral edge. A groove 21H is formed in the other edge surface 21D situated at the inner peripheral edge of the arcuate configuration. The groove 21H comprises a configuration recessing the sectional configuration of the side frame 21 and extends along the longitudinal direction of the side frame 21. The groove 21H is situated in a region spaced away from a position where the other edge surface 21D and the flange portion 27B are welded together.

The groove 21H is formed in the other edge surface 21D situated at the inner peripheral edge of the side frame 21. Thus, local deformation generated at the time of bending the side frame 21 can be relieved due to the groove 21H. As a result, the side frame 21 can be formed in a smooth, curved configuration substantially free from wrinkles. Thus, even when there is employed a high strength steel material like a high tension steel plate, which would be otherwise be subject to generation of wrinkles when bent into an arcuate configuration, it is possible to form the side frame 21 in a satisfactory manner. Thus, it is possible to enhance the structural strength of the side frame 21.

Figure 8:
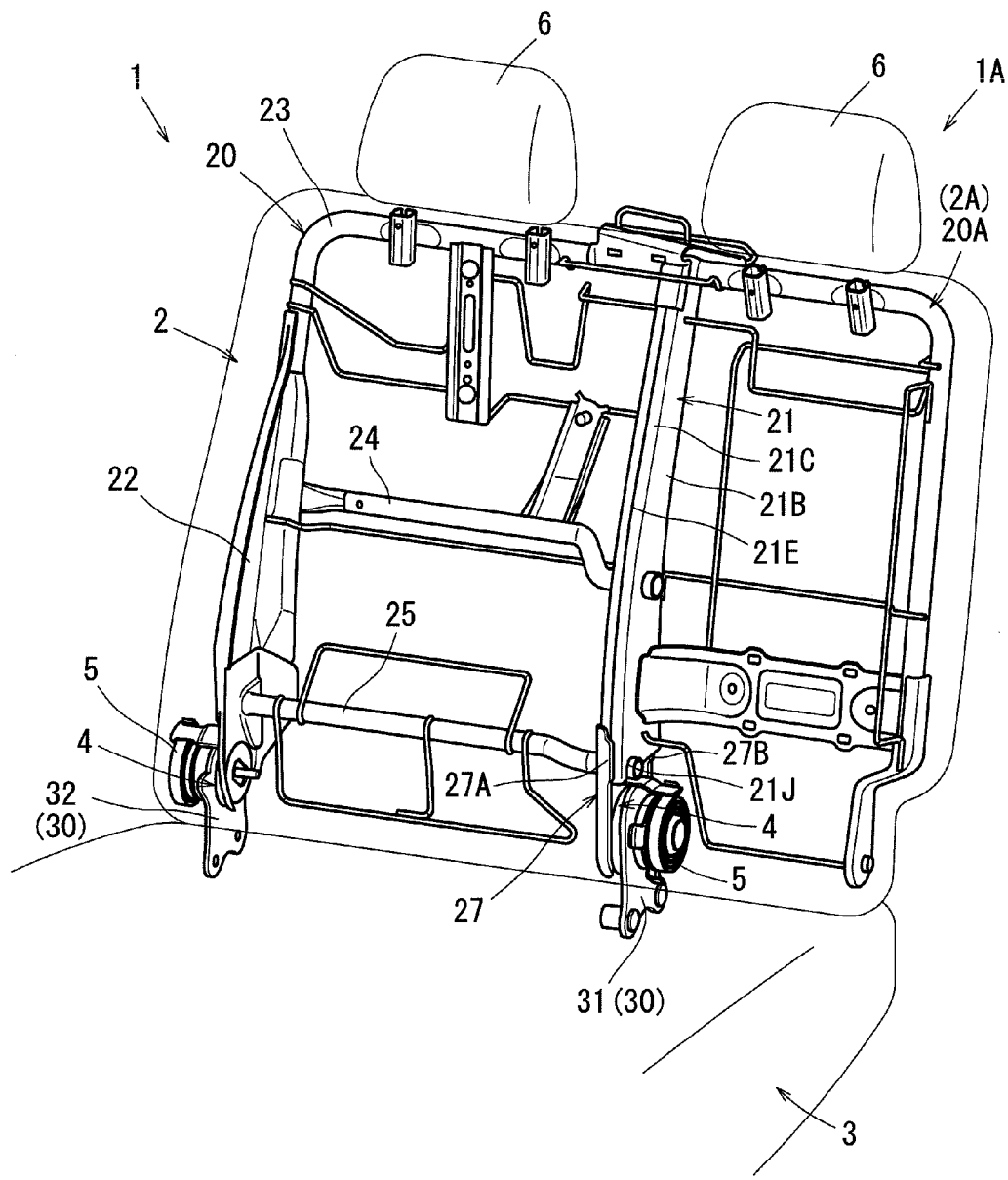
FIG. 8 is a perspective view of a seat frame structure for a vehicular seat according to another embodiment.
Figure 9:
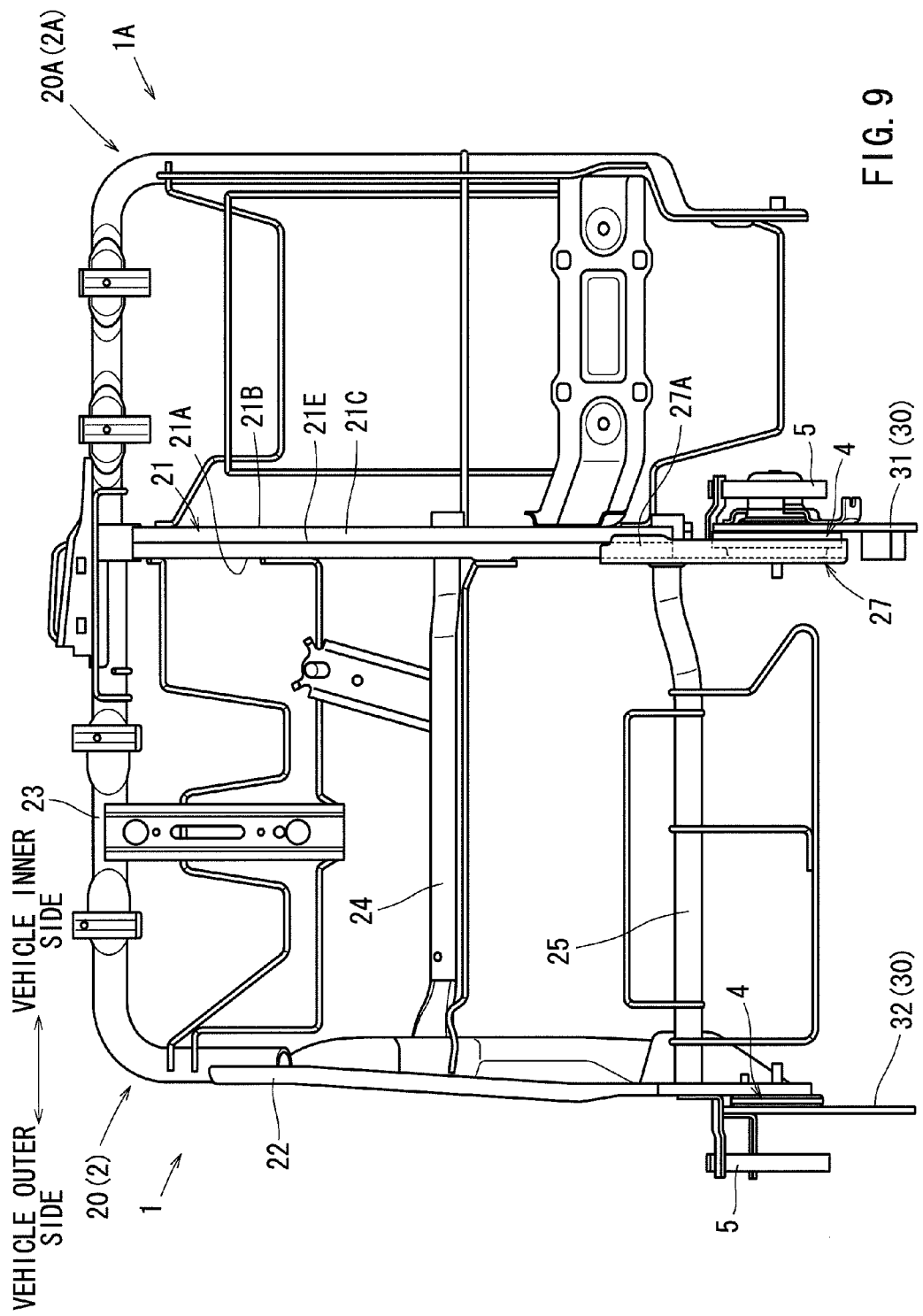
FIG. 9 is a front view of the seat frame structure of FIG. 8.

The vehicle seat 1 shown in FIGS. 8 and 9 will be described. The vehicle seat 1 illustrated in FIGS. 8 and 9 have members that are substantially the same as those of the vehicle seat 1 shown in FIG. 1, etc. These same members are indicated by the same reference numerals, and a description thereof will be left out. The vehicle seat 1 shown in FIGS. 8 and 9 is formed as a seat to be arranged in the rearmost row of a vehicle. The seat in the rearmost row is for three persons to sit on. The seat is divided in a proportion of 6:4. The vehicle seat 1 is larger (i.e., the one corresponding to 6 of the above proportion) of these divisional seats. The vehicle seat 1 is for two persons to sit on. The vehicle seat 1 is integrally equipped with a central seat 1A of a small lateral width situated at the center of the vehicle.

The vehicle seat 1 has the seatback frame 20A of a reverse-U-shaped configuration, and the side frame 21 situated at the seat center. A seatback frame 20A serves as the frame structure of a seatback 2A of the central seat 1A. The seatback frame 20A is integrally connected to the side frame 21. The side frame 21 supports the seatback frame 20A of the central seat 1A in a cantilever-like fashion. The side frame 21 preferably has a high structural strength enabling it to support the seatback frame 20A. The side frame 21 is substantially of the same construction as the side frame 21 shown in FIG. 1, etc.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

For example, the side frame of a closed cross-sectional configuration may be a side frame of a seatback as described above. Instead, the side frame of a closed cross-sectional configuration may be a side frame of a seat cushion.

The plate-like bracket may be provided on a side frame of a seatback as described above. Instead, the plate-like bracket may be provided on a side frame of a seat cushion. Regarding the plate-like bracket, it is possible for a side frame and a reclining device to be attached thereto so as be arranged side by side in a direction different from the width direction, e.g., the vertical direction.

It may be the inner side surface or the outer side surface of the side frame that is connected to the bracket.

As described above, the side frame may exhibit a rectangular closed cross-sectional configuration. Instead, the side frame may be of some other type of closed cross-sectional configuration, such as a triangular or an elliptical one.

This invention claims:
1. A vehicle seat comprising:
a side frame having a side frame configuration which is either a closed cross-sectional configuration, two side walls arranged to face each other, two side walls arranged in a connected manner, a rectangular shaped closed cross-sectional configuration, or a closed cross-sectional configuration comprised of multiple surfaces;
a bracket formed from a plate member, the bracket including an inner side surface that connects with the side frame; and
a reclining device connected to the inner side surface of the bracket to which the side frame is connected, so that the reclining device is connected to the side frame via the bracket, wherein
the bracket comprises flange portions extending along edge surfaces of the side frame to hold the side frame in a direction lateral to the side frame, wherein the flange portions are welded to the edge surfaces of the side frame, wherein the side frame comprises a welded seam that defines the side frame configuration of the side frame, and wherein the seam is provided at a first edge surface of the side frame, and wherein one of the flange portions extends along the first edge surface of the side frame to cover the seam and includes an extending end welded to the first edge surface.

2. The vehicle seat of claim 1, wherein the side frame configuration comprises an arcuate configuration and the first edge surface provided with the seam defines an outer peripheral edge of the arcuate configuration, wherein a groove is provided in a second edge surface of the side frame and is provided at an inner peripheral edge of the arcuate configuration, wherein the groove is a recess of the side frame that extends along a longitudinal direction of the side frame, and wherein the groove is provided in a region of the side frame spaced away from a position where the second edge surface and the flange portion are welded together.

* * * * *